US006726856B2

(12) United States Patent
Glausch

(10) Patent No.: US 6,726,856 B2
(45) Date of Patent: Apr. 27, 2004

(54) PROCESS FOR PREPARING ELECTRICALLY CONDUCTIVE PIGMENTS

(75) Inventor: Ralf Glausch, Mühltal (DE)

(73) Assignee: Merck Patent Gesellschaft, Darmstadt (DE)

(*) Notice: Subject to any disclaimer, the term of this patent is extended or adjusted under 35 U.S.C. 154(b) by 354 days.

(21) Appl. No.: 09/982,537

(22) Filed: Oct. 19, 2001

(65) Prior Publication Data

US 2002/0053661 A1 May 9, 2002

(30) Foreign Application Priority Data

Oct. 19, 2000 (DE) ......................... 100 51 872

(51) Int. Cl.⁷ ................ H01B 1/08; C01G 1/02; C01G 19/02
(52) U.S. Cl. ............... 252/520.1; 252/521.5; 423/94; 423/472
(58) Field of Search .............. 252/520.1, 521.5; 106/415, 417; 423/91, 94, 472, 311, 618

(56) References Cited

U.S. PATENT DOCUMENTS

| 4,431,764 A | 2/1984 | Yoshizumi |
| 5,003,041 A | 3/1991 | Morris et al. |
| 5,221,719 A | 6/1993 | Morris et al. |
| 5,269,970 A | 12/1993 | Ruf et al. |
| 5,350,448 A | 9/1994 | Dietz et al. |
| 5,536,447 A | 7/1996 | Pfaff et al. |
| 5,569,412 A | * 10/1996 | Feist et al. ............... 252/519.2 |
| 5,720,904 A | * 2/1998 | Jones ........................ 252/520.1 |
| 5,753,024 A | 5/1998 | Vogt et al. |
| 6,221,144 B1 | 4/2001 | Dietz et al. |

FOREIGN PATENT DOCUMENTS

DE 44 35 301 A1 10/1994

OTHER PUBLICATIONS

English Abstract of DE 4435301A.
English Abstract of JP 60223167.
English Abstract of JP 62050344.
European Search Report, Feb. 20, 2002.

* cited by examiner

*Primary Examiner*—Mark Kopec
(74) *Attorney, Agent, or Firm*—Millen, White, Zelano & Branigan, PC.

(57) ABSTRACT

The invention relates to a process for preparing electrically conductive pigments based on $F^-$- and/or $PO_4^{3-}$-doped tin mixed oxides applied as an electrically conductive layer to a substrate, in which, first of all, $SnO_2$-coated substrates are prepared by precipitation and subsequent calcining and then, in further process steps, this $SnO_2$ layer is converted into a tin mixed oxide layer doped with $F^-$ and/or $PO_4^{3-}$. The invention further relates to electrically conductive pigments prepared by the process of the invention, to the use of these pigments for pigmenting lacquers, printing inks, plastics systems or coatings, and to lacquers, printing inks, plastics systems or coatings pigmented with an electrically conductive pigment prepared by the process of the invention.

14 Claims, No Drawings

PROCESS FOR PREPARING ELECTRICALLY CONDUCTIVE PIGMENTS

The invention relates to a process for preparing electrically conductive pigments based on $F^-$- and/or $PO_4^{3-}$-doped tin mixed oxides applied as an electrically conductive layer to a substrate. The invention further relates to electrically conductive pigments prepared by the process of the invention, to the use of these pigments for pigmenting lacquers, printing inks, plastics systems or coatings, and to lacquers, printing inks, plastics systems or coatings pigmented with an electrically conductive pigment prepared by the process of the invention.

In many sectors of industry there is a need for conductive pigments which can be used, for example, to produce plastics, lacquers, coatings or the like which are electrically conductive or antistatic or which screen against electromagnetic waves. Conductive carbon black is used in large amounts for this purpose and yet because of its high light absorption in the visible spectral region cannot be used for transparent, pale or coloured coatings. A further problem is the strong absorption of carbon black in the IR region, which in the case, for example, of solar irradiation leads to frequently unwanted warming of the coated articles.

For pale, electrically conductive coatings, therefore, nickel-coated graphite, metal flakes and mixed oxides, such as antimony-doped tin dioxide ($SnO_2$), for example, are being used. The mixed oxides mentioned may have been applied to supports, for example to platelet-shaped mica or spherical barium sulfate. The use of a mixed oxide in this way as an electrically conductive layer on a substrate has the twin advantages firstly that the behaviour of the pigments in coating systems and on other polymeric layers is improved and secondly that it is possible to reduce the price of these systems.

U.S. Pat. No. 4,431,764 describes, for example, transparent, electrically conductive coatings comprising a film-forming binder and finely divided tin oxide doped with from 0.1 to 20% by weight of antimony in the form of $Sb_2O_3$ or $Sb_2O_5$. EP-A-0 375 575 discloses conductive platelet-shaped pigments comprising as conductive layer an antimony-doped tin oxide, with a thin silicon dioxide layer arranged between the conductive layer and the substrate. The application of an additional layer to the substrate, however, significantly increases the complexity of the preparation process and therefore makes the pigment more expensive. Furthermore, antimony-containing tin oxides possess the disadvantage that they have a blue coloration to a greater or lesser extent depending on the antimony content and calcining temperature. A further factor is that tin oxides containing antimony oxide, and substances containing antimony oxide in general, do not appear to be unobjectionable from a toxicological viewpoint.

JP 60-223167 and JP 62-050344 describe mica platelets and kaolin platelets coated with indium-tin oxide (ITO) and featuring relatively high transparency and relatively good electrical conductivity. The disadvantage of these pigments, however, lies in the relatively high price of indium. DE-A-43 33 673 describes electrically conductive pigments in which the dopants used include, instead of antimony oxide, oxides of aluminium. The disadvantage of these mixed oxides, however, lies in the low temporal stability of the resistance of these pigments.

In order to obtain electrically conductive pigments with a high and temporally stable electrical resistance, therefore, DE-A-198 11 694 doped tin mixed oxide with fluoride ($F^-$) and/or phosphorus ($P^{5+}$) by reacting hydrolysable tin(II) and tin(IV) compounds in water in the presence of one or more fluorides and/or phosphorus compounds. The doped mixed oxides thus obtained were applied as an electrically conductive layer to a substrate.

The preparation process by which these $F^-$- and/or $P^{5+}$-doped electrically conductive layers applied to a substrate were prepared is, however, comparatively expensive and complex. Another possibility for preparing electrically conductive pigments based on $F^-$- and/or $P^{5+}$-doped tin mixed oxides is to grind $SnO_2$, $SnO$ and also $F^-$ and/or $PO_4^{3-}$ using high mechanical force and then to calcine the ground pigments under a nitrogen atmosphere. In this way, although it is possible to obtain electrically conductive pigments having a resistance of between 200 and 300 $\Omega.cm$, these products have a high surface roughness and are therefore of only limited usefulness in polymer solutions, such as coating materials. Moreover, the use of these products as an electrically conductive layer on substrates is not possible by this method.

Accordingly, it was an object of the present invention to provide a process for preparing electrically conductive pigments based on $F^-$- and/or $PO_4^{3-}$-doped tin mixed oxides applied as an electrically conductive layer to a substrate which is comparatively simple and inexpensive. This process should nevertheless lead to electrically conductive pigments which possess acceptable conductivities and in which the aforementioned disadvantages are at least present to a lesser extent.

It has surprisingly now been found that electrically conductive pigments based on $F^-$- and/or $PO_4^{3-}$-doped tin mixed oxides applied as an electrically conductive layer to a substrate may be prepared by first preparing $SnO_2$-coated substrates, in a simple and inexpensive process, and by then converting this $SnO_2$ layer into a tin mixed oxide layer doped with $F^-$- and/or $PO_4^{3-}$, in further process steps.

The present invention accordingly provides a process for preparing electrically conductive pigments based on $F^-$- and/or $PO_4^{3-}$-doped tin mixed oxides applied as an electrically conductive layer to a substrate. In this process, first of all, a substrate coated with tin(IV) oxide hydrate is prepared by adding a hydrolysable tin(IV) compound to an aqueous solution containing the substrate in suspended form, at a pH and temperature which permit complete hydrolysis of the tin(IV) compound, and this substrate is separated from the suspension and, if desired, washed and dried, and is subsequently calcined at a temperature between 600 and 1000° C. to form a substrate coated with $SnO_2$.

The hydrolysable tin(IV) compound is preferably used in an amount such that the $SnO_2$, after calcining of the tin(IV) oxide hydrate-coated substrate, possesses a weight fraction of from 5 to 200% by weight, preferably from 30 to 100% by weight, with particular preference from 40 to 60% by weight, based on the weight of the substrate.

Substrates which can be used include all water-insoluble inorganic compounds, preferably in the form of platelet-shaped particles or else spherical particles. Preferred substrates used comprise mica, glass flakes, talc, graphite, $Al_2O_3$, $BaSO_4$, $ZnO$, $SiO_2$ or else a mixture of these substances. These particles preferably have an average diameter of less than 150 $\mu m$ and, with particular preference, not more than 100 $\mu m$. Platelet-shaped substrates preferably have an extent in the main dimension of less than 150 $\mu m$ and, with particular preference, less than 100 $\mu m$, and their thickness is preferably less than 10 $\mu m$, with particular preference not more than 2 $\mu m$. The ratio of the extent in the main dimension to the thickness (aspect ratio) in the platelet-shaped substrates is preferably more than 3 and with particular preference more than 5.

In further process steps, the $SnO_2$ layer is subsequently converted into a tin mixed oxide layer doped with $F^-$ and/or $PO_4^{3-}$.

In one preferred embodiment of the process of the invention, this conversion of the $SnO_2$ layer into a tin mixed oxide layer doped with $F^-$ and/or $PO_4^{3-}$ takes place by first reducing the $SnO_2$-coated substrate with a reducing agent to form a substrate coated with an $SnO_2/SnO/Sn$ mixed oxide. The reducing agent used in this case is preferably hydrogen or silicon. The substrate coated with this tin mixed oxide is subsequently ground with salts or salt mixtures containing $F^-$ and/or $PO_4^{3-}$ and finally is calcined in the absence of oxygen at a temperature of between 300 and 900° C. This gives a substrate which is coated with a tin mixed oxide layer doped with $F^-$ and/or $PO_4^{3-}$. The salts or salt mixtures used that contain $F^-$ and/or $PO_4^{3-}$ are preferably NaF, $NH_4F$, $Na_2HPO_4$, $(NH_4)_2HPO_4$ or mixtures of these salts. These salts or salt mixtures are ground with the substrates coated with an $SnO_2/SnO/Sn$ mixed oxide preferably in an amount such that the salts or salt mixtures possess a weight fraction of from 1 to 15% by weight, with particular preference from 2 to 10% by weight, with very particular preference from 4 to 8% by weight, based on the weight of the substrate coated with the $SnO_2/SnO/Sn$ mixed oxide.

In a further, preferred embodiment of the process of the invention, the conversion of the $SnO_2$ layer into a tin mixed oxide layer doped with $F^-$ and/or $PO_4^{3-}$ takes place by grinding the $SnO_2$-coated substrate with a compound containing fluorine or phosphate, e.g., $SnF_2$ and/or $SnHPO_4$, and finally calcining it in the absence of oxygen at a temperature of between 300 and 900° C. This gives a substrate which is coated with a tine mixed oxide layer doped with $F^-$ and/or $PO_4^{3-}$. The $SnO_2$-coated substrate is ground with $SnF_2$ and/or $SnHPO_4$ preferably in an amount such that $SnF_2$ and/or $SnHPO_4$ possess a weight fraction of from 1 to 15% by weight, with very particular preference from 4 to 8% by weight, based on the weight of the $SnO_2$-coated substrate.

In the process of the invention it is preferred to use $F^-$ and $PO_4^{3-}$ for doping. The ratio of $F^-$ to $PO_4^{3-}$ is preferably between 1:2 and 2:1.

In comparison to the precipitation of hydrolysable tin(II) and tin(IV) salts in the presence of $F^-$ and/or $PO_4^{3-}$, the process of the invention is less complex and, moreover, less expensive, and yet gives electrically conductive pigments having acceptable resistances.

The invention further relates to electrically conductive pigments prepared by the process of the invention.

The invention additionally relates to the use of electrically conductive pigments prepared by the process of the invention for pigmenting lacquers, printing inks, plastics systems or coatings.

Finally, the invention relates to lacquers, printing inks, plastics systems or coatings pigmented with an electrically conductive pigment prepared by the process of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure of all applications, patents and publications, cited above, and of corresponding German application No. 10051872.9, filed Oct. 19, 2000 is hereby incorporated by reference.

WORKING EXAMPLES

Preparation of the $SnO_2$-coated Substrates 100 g of mica are suspended in 2.5 liters of deionized water and the suspension is heated to 75° C. The pH of this suspension is adjusted to 2.1. Subsequently, 75 ml of an aqueous solution of $SnCl_4$ are added dropwise at a rate of from 0.5 to 1 ml/min with a stirring speed of from 400 to 1000 rpm. After all of the $SnCl_4$ has been added, the substrate coated with tin(IV) oxide hydrate is separated off, washed and dried at from 120 to 140° C. The dried product is subsequently calcined at from 600 to 1000° C. The resistance of the $SnO_2$-coated substrate obtained is less than 1000 kΩ.cm.

Example 1

Preparation of the Electrically Conductive Pigments 40 g of the $SnO_2$-coated substrate are reduced in an $H_2/N_2$ gas stream (15%/85%) at 600° C. for 30 minutes. The resistance of the substrate coated with an $SnO_2/SnO/Sn$ mixed oxide at this point in time is approximately 1 kΩ.cm. 20 g of the substrate coated with the $SnO_2/SnO/Sn$ mixed oxide are subsequently ground with 1 g of NaF and 1 g of $Na_2HPO_4$ and calcined under a nitrogen atmosphere at 600° C. for 30 minutes. This gives a pale grey pigment powder. The resistance of the $SnO_2/SnO/Sn$ mixed oxide obtained in this way, doped with $F^-$ and $PO_4^{3-}$ and applied to a substrate, is 350 Ω.cm.

Example 2

Preparation of the Electrically Conductive Pigments 20 g of the $SnO_2$-coated substrate are ground with 1 g of $SnF_2$ and 1 g of $SnHPO_4$ and calcined under a nitrogen atmosphere at 600° C. for 30 minutes. This gives a pale grey pigment powder. The resistance of the $SnO_2/SnO$ mixed oxide thus obtained, doped with $F^-$ and $PO_4^{3-}$ and applied to a substrate, is 300 Ω.cm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing electrically conductive pigments comprising an $F^-$- and/or $PO_4^{3-}$-doped tin mixed oxides electrically conductive layer on a substrate, said process comprising coating a substrate with tin(IV) oxide hydrate by adding a hydrolysable tin(IV) compound to an aqueous solution containing the substrate in suspended form, at a pH and temperature which permit complete hydrolysis of the tin(IV) compound, separating the substrate from the suspension, optionally washing and drying, and calcining at a temperature between 600 and 1000° C. to form a substrate coated with a layer of $SnO_2$, and converting the $SnO_2$ layer into a tin mixed oxide layer doped with $F^-$ and/or $PO_4^{3-}$.

2. The process according to claim 1, wherein the hydrolysable tin(IV) compound is added to the substrate suspension in an amount such that the $SnO_2$, after calcining of the tin(IV) oxide hydrate-coated substrate, possesses a weight fraction of from 5 to 200% by weight based on the weight of the substrate.

3. A process for preparing electrically conductive pigments comprising an $F^-$- and/or $PO_4^{3-}$-doped tin mixed oxides electrically conductive layer on a substrate, said process comprising converting a $SnO_2$ layer on a substrate into a tin mixed oxide layer doped with $F^-$ and/or $PO_4^{3-}$.

4. A process for preparing electrically conductive pigments comprising an $F^-$- and/or $PO_4^{3-}$-doped tin mixed oxides electrically conductive layer on a substrate, said process comprising grinding a tin mixed oxide coated substrate with a salt or salt mixture containing $F^-$ and/or $PO_4^{3-}$, or, with a compound containing fluorine or phosphate.

5. The process according to claim 4, comprising first converting a $SnO_2$ layer on a substrate into a tin mixed oxide layer by reducing the $SnO_2$-coated substrate with a reducing agent to form a substrate coated with an $SnO_2/SnO/Sn$ mixed oxide and subsequently grinding the substrate coated with thin tin mixed oxide with salts or salt mixtures containing $F^-$ and/or $PO_4^{3-}$ and optionally calcining the ground pigment.

6. The process according to claim 5, wherein calcining is conducted in the absence of oxygen at a temperature of between 300 and 900° C.

7. The process according to claim 5, comprising reducing with a reducing agent which is water or silicon.

8. The process according to claim 5, comprising converting the $SnO_2$ layer into a tin mixed oxide layer doped with $F^-$ and/or $PO_4^{3-}$ by grinding the $SnO_2$-coated substrate with $SnF_2$ and/or $SnHPO_4$ and optionally calcining.

9. The process according to claim 8, wherein calcining is conducted in the absence of oxygen at a temperature of between 300 and 900° C.

10. The process according to claim 8, wherein the $SnO_2$-coated substrate is ground with $SnF_2$ and/or $SnHPO_4$ in an amount such that $SnF_2$ and/or $SnHPO_4$ possess a weight fraction of from 1 to 15% by weight based on the weight of the $SnO_2$-coated substrate.

11. The process according to claim 4, wherein the salt or salt mixtures containing $F^-$ and/or $PO_4^{3-}$ is NaF, $NH_4F$, $Na_2HPO_4$, $(NH_4)_2HPO_4$ or a mixture thereof.

12. The process according to claim 4, wherein the substrate coated with a tin mixed oxide is ground with a salt or salt mixture containing $F^-$ and/or $PO_4^{3-}$ in an amount such that the salt or salt mixture possesses a weight fraction of from 1 to 15% by weight based on the weight of the substrate coated with tin mixed oxide.

13. The process according to claim 4, wherein the substrate comprises mica, $SiO_2$ flakes, talc, graphite, $Al_2O_3$, $BaSO_4$, ZnO, $SiO_2$ or a mixture thereof.

14. The process according to claim 4, wherein the mixed oxide on the substrate is doped with $F^-$ and $PO_4^{3-}$, in a ratio of $F^-$ to $PO_4^{3-}$ 1:2 and 2:1.

* * * * *

UNITED STATES PATENT AND TRADEMARK OFFICE
CERTIFICATE OF CORRECTION

PATENT NO. : 6,726,856 B2
DATED : April 27, 2004
INVENTOR(S) : Ralf Glausch

Page 1 of 1

It is certified that error appears in the above-identified patent and that said Letters Patent is hereby corrected as shown below:

<u>Title page,</u>
Item [73], Assignee, change "Merck Patent Gesellschaft" to -- Merck Patent Gesellschaft mit Beschränkter Haftung --.

<u>Column 5,</u>
Line 20, please change "salts" to -- a salt --.

Signed and Sealed this

Twenty-first Day of June, 2005

JON W. DUDAS
*Director of the United States Patent and Trademark Office*